United States Patent

[11] 3,615,749

[72] Inventors John Henry Cramer;
Walter Eldon Ness, both of Marietta, Ohio
[21] Appl. No. 47,874
[22] Filed June 19, 1970
[45] Patented Oct. 26, 1971
[73] Assignee American Cyanamid Company
Stamford, Conn.
Continuation-in-part of application Ser. No. 650,639, July 3, 1967, now Patent No. 3,523,811, dated Aug. 11, 1970.

[54] PRINTING INK OF IMPROVED BLACKNESS
1 Claim, No Drawings
[52] U.S. Cl. ................................................. 106/20,
106/23, 106/27, 106/28, 106/29, 106/30, 106/32,
106/219, 106/235, 106/241
[51] Int. Cl. ..................................................... C09d 11/00,
C09d 11/02, C09d 11/16
[50] Field of Search ........................................... 106/304,
307, 308 N, 29–32, 219, 235, 241, 243, 269, 280, 281

[56] References Cited
UNITED STATES PATENTS

| | | | |
|---|---|---|---|
| 113,755 | 4/1871 | Farrer ........................... | 106/307 |
| 2,005,697 | 6/1935 | Grove ........................... | 23/77 |
| 2,282,006 | 5/1942 | Slvan ............................ | 106/304 X |
| 2,589,674 | 3/1952 | Cook et al. ................... | 260/404.5 |
| 2,742,375 | 4/1956 | Cook et al. ................... | 106/308 |
| 2,785,079 | 3/1957 | Voet ............................. | 106/307 X |
| 2,823,205 | 2/1958 | Lacey et al. .................. | 260/270 |
| 2,893,886 | 7/1959 | Erskine et al. ................ | 106/272 |
| 3,353,974 | 11/1967 | Trimble et al. ............... | 106/304 X |
| 3,014,810 | 12/1961 | Dybalski et al. .............. | 106/308 |

Primary Examiner—Julius Frome
Assistant Examiner—Joan B. Evans
Attorney—Samuel Branch Walker ABSTRACT: Carbon black ink compositions of improved blackness result from treating a ferric ammonium ferrocyanide pigment, (iron blue) preferably while still in aqueous dispersion, with a cationic surfactant of the asphalt antistripping type, such as an alkylamidoalkylhydroxyalkyl quaternary ammonium compound, such as stearamidopropyl dimethyl-2-hydroxyethyl ammonium nitrate, and incorporating in the ink to prevent browning.

PRINTING INK OF IMPROVED BLACKNESS

RELATED APPLICATIONS

This is a continuation-in-part of our application Ser. No. 650,639, July 3, 1967, PIGMENTARY FERRIC AMMONIUM FERROCYANIDE PARTICLE WITH CATIONIC SURFACTANT COATING, now U.S. Pat. No. 3,523,811, dated Aug. 11, 1970.

BACKGROUND OF THE INVENTION

1. Field of the Invention

This invention relates to iron blue pigment inks which show an improved resistance to color change or loss of strength or change of hue or tone, hereafter called strength loss, which are obtained by treating an iron blue pigment with a surface-modifying agent which causes the individual pigment particles to remain independent and each contribute to the coloration of an ink. On standing, particularly in the presence of heat and moisture, inks containing conventional iron blue pigments tend to change hue and decrease in intensity—i.e. lose strength. The loss of strength is at least compatible with the theory that individual pigment particles coalesce or flocculate thereby reducing the number of separate particles which contribute towards the color, although other phenomena may be involved.

2. Description of the Prior Art

Cook and Moss, U.S. Pat. No. 2,589,674, "Aliphatic Amido Propyl Quaternary Ammonium Salts," Mar. 18, 1952, disclose quaternary ammonium compounds of the "formula

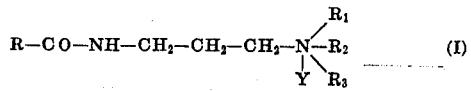

wherein R is a member of the group consisting of aliphatic and alicyclic radicals containing at least 7 carbon atoms such as nonyl, undecyl, tridecyl, heptadecyl, the residue of abietic acid, and the like radicals; $R_1$ and $R_2$ are members of the group consisting of alkyl and hydroxyalkyl radicals of 1 to 3 carbon atoms such as, for example, methyl, ethyl, propyl, isopropyl, hydroxyethyl, dihydroxypropyl, and the like radicals; $R_3$ is a hydroxyalkyl radical of 1 to 3 carbon atoms such as, for example, hydroxyethyl, hydroxypropyl, dihydroxypropyl and the like; and Y is an anion such as, for example, halogen, hydrogen sulfate, thiocyanate, etc."

Lacey & Waitkins, U.S. Pat. No. 2,823,205, "Oil and Spirit-Soluble Derivatives of Phthalocyanines," Feb. 11, 1958, in example 6, disclose adding stearamidopropyldimethyl-beta-hydroxy ethyl ammonium chloride to the sodium salt of tetra-(o-carboxybenzamidomethyl) copper phthalocyanine to get a spirit-soluble colorant from printing inks.

Miss Newman, U.S. Pat. No. 3,133,893, "Pigment Particles Coated with Polymer & Method of Preparing Same," May 19, 1964, shows dispersal of pigments in water as a press cake with stearamidopropyldimethylhydroxyethyl ammonium chloride, adding a monomer such as acrylonitrile, polymerizing on the surface of the pigment particles, and obtaining polymer-coated pigment particles, which are readily dispersible in a polymer solution for dope-dyed textile fibers, such as acrylic fibers, or in printing inks, etc.

Carpenter and Kolodny, U.S. Pat. No. 2,937,106, "Dialkyl-polyaminopolyalkalene Amides as Asphalt Antistripping Agents," May 17, 1960, disclose "compounds of the general formula:

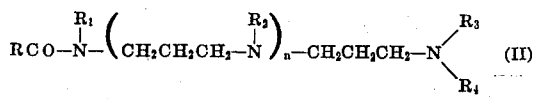

where the RCO is an acyl group derived from a carboxylic acid of from 12 to 20 carbon atoms which may be of the saturated or unsaturated fatty acid series, and particularly naturally occurring acids and their mixtures, $R_1$ and $R_2$ are hydrogen or 1 to 4 carbon alkyl radicals, $R_3$ and $R_4$ are alkyl radicals of from 1 to 4 carbon atoms, and $n$ is a small whole number, not less than 1 nor more than 4; and the fatty acid and rosin acid salts of these amides."

Other asphalt antistripping agents are also disclosed therein.

SUMMARY OF THE INVENTION

Iron blue is a ferric ammonium ferrocyanide of somewhat variable chemical composition produced by the reaction of ammonium sulfate and ferrous sulfate and sodium ferrocyanide, in an aqueous media. Either atmospheric oxygen or an oxidizing agent such as sodium or potassium dichromate or sodium chlorate gives at least a partial oxidation and changes the pale blue slurry to a pigment grade of iron blue. The digest volume, "The Chemistry of the Ferrocyanides," American Cyanamid Company, Wayne, New Jersey, 1953, Beacon Press, New York, has 742 references to various phases of the chemistry of the ferrocyanides. One ferrocyanide useful as a pigment, Prussian Blue, was referred to by Diesbach in 1704.

The iron blues are among the most economical of the blue colors on a price-strength basis. Printing inks including those used for printing newspapers are customarily made with carbon black, and often other colors, as pigments in a composition containing oils, solvents, frequently naturally occurring resinous materials such as asphalts and other agents to modify the hue, tone or intensity and drying properties and acceptability by various types of papers, ease of flowing through the various feed systems to the type as well as improving general rheological properties. Commercial carbon blacks normally produce a yellowish or brownish black printing ink. By proper toning with purple or blue a so-called neutral black is obtained. For this all of the radiant light energy is absorbed. Iron blue is commonly used as one of the pigments for toning carbon black inks.

Such an ink on standing will revert to the yellowish shade if the blue pigment loses its efficiency, and changes hue, tone or intensity.

Iron blue pigments may also be used as the only color, or as a toner for other colors.

Hue and strength changes are quite common in ink and paint systems. In the present iron blues, heat and moisture tend to increase the rate of strength loss. The use of the agents of the present invention appears to cause the pigment particles to be more flocculation-resistant, and as a result the individual iron blue pigment particles remain separate from other pigment particles and as a result the strength of the blue effect remains, and the ink instead of turning brown remains the desired shade of black.

Other treating agents for modifying properties such as texture-improving agents, and emulsifying agents, such as mineral oil and sulfonated oils, may be present also.

Cationic surfactants, including those which have been used as asphalt antistripping agents, give a major increase in the resistance to heat and moisture so that the strength loss is markedly decreased. The quaternaries shown in Cook & Moss, U.S. Pat. No. 2,589,674 supra, are incorporated into the pigment composition by adding the quaternary to the pigment composition while still in the slurry as formed, or the agents may be sprayed or ball milled onto the pigment composition later in processing. A usage from about 1 percent to 15 percent, preferably in the order of 3 percent to 4 percent based on the weight of the iron blue pigment appears to be an economically desirable range.

Preferred quaternary compounds are stearamidopropyl-dimethyl-2-hydroxyethyl ammonium nitrate and stearamidopropyldimethyl-2-hydroxyethyl ammonium dihydrogen phosphate. Other long-chained fatty acids may be used to form the amido group, such as palmitic acid or the tall oil group of acids. The preparation of such compounds is described in said U.S. Pat. No. 2,589,674.

The loss of strength can be tested by preparing inks containing the particular iron blue under consideration with or without carbon black. These inks may then be drawn down on hard paper or news stock alone or over a test print area. The strength loss is compared by duplicating the tests before and after holding under test conditions of time, temperature and moisture exposure. The aging is accelerated at higher temperatures. Any standardized conditions can be used for comparative purposes, and may vary depending on the ultimate storage and use conditions contemplated.

In the following examples, all parts are by weight unless clearly otherwise stated.

EXAMPLE 1

To a slurry of 4,500 parts of a commercial iron blue pigment in water, as formed without previous drying, there is added 136 parts of stearamidopropyldimethyl-2-hydroxyethyl ammonium nitrate. The mixture is stirred for 5 minutes after which it is filtered, dried and ground in the conventional manner. When used in ink with carbon black, marked improvement in strength loss resistance is obtained. The amount of the quaternary is about 3 percent based on the dry weight of the iron blue pigment composition.

EXAMPLE 2

To a conventional dry iron blue pigment which had already been formed, dried, and prepared in pigmentary form, in a blender which was kept stirring continuously, there was added 3 percent of the weight of the pigment of stearamidopropyl-dimethyl-2-hydroxyethyl ammonium nitrate as a 50 percent solution in a water-isopropyl base. Stirring was continued until the blend was uniform.

The product in otherwise conventional ink formulations showed greater resistance to strength loss than the same pigment which had not been so treated.

Similar results are obtained when using the phosphate salt as well as when using tall oil amidopropyldimethyl-2-hydroxyethyl ammonium phosphate (i.e. the fatty acids from tall oil) or when using other long-chain fatty acid compounds of the type described in said U.S. Pat. No. 2,589,674.

The present treated iron blues can be used in conventional ink formulations. Standard textbooks which present many such inks include:

Ink Technology for Printers and Students E. A. Apps, Chemical Publishing Co., N.Y., 1964

Printing Ink Manual, F. A. Askew, Editor Heffer & Sons, Cambridge, England, Second Edition, 1969

Kirk-Othmer, Encyclopedia of Chemical Technology, Interscience, New York 1966, Vol. 11, pages 611 to 632 under "- Printing Inks".

EXAMPLE 3

To a ball mill containing steel balls as a grinding medium, is charged the following:
80 parts mineral oil
10 parts carbon black
6 parts limed wood rosin
4 parts iron blue, from example 1.

The charge is ground to develop a smooth ink, which takes from about 16 to 24 hours. Overnight milling is convenient.

The ink so produced works well in letterpress printing on newspaper stock.

EXAMPLE 4

Following the procedure of example 3 is charged:
50 parts toluol
40 parts zinc resinate
10 parts iron blue, from example 1.

EXAMPLE 5

As in example 3 with a charge as follows:
80 parts mineral oil
10 parts carbon black
6 parts calcium resinate
3.5 parts improved iron blue (example 1)
0.5 parts methyl violet toner The product gives a black gravure ink, which retains its strength well and is brown-out resistant.

EXAMPLE 6

As in example 3 with a charge as follows:
40 parts naphtha
17 parts toluol
5 parts carbon black
35 parts gilsonite
2.5 parts improved iron blue (example 1)
0.5 parts methyl violet toner
This ink is a good gravure printing ink.

EXAMPLE 7

As in example 3 with the following charge:
39 parts naphtha
20 parts toluol
35 parts gilsonite
6 parts improved iron blue (example 1)
This ink is a good gravure printing ink.

EXAMPLE 8

As in example 3 with the following charge:
40 parts naphtha
20 parts toluol
15 parts gilsonite
20 parts limed wood rosin
5 parts improved iron blue (example 1)
This a good gravure printing ink.

EXAMPLE 9

As in example 3 with the following charge:
40 parts naphtha
15 parts toluol
32 parts limed wood rosin
3 parts improved iron blue (example 1)
10 parts china clay
This a good gravure printing ink.

When commercial iron blues as purchased in the market have added thereto a long-chained alkylamidoalkyl-hydroxyalkyl quaternary ammonium compound, valuable increases in strength loss resistance are obtained in printing inks compounded therefrom.

We claim:
1. A printing ink comprising:
a carbon black
a vehicle and as an additive to improve the hue and give greater blackness and storage stability to the ink, an iron blue pigment comprising:
finely divided ferric ammonium ferrocyanide particles of pigmentary size which particles individually have thereon a coating of from 1 percent to 15 percent by weight of pigment of a quaternary ammonium compound of the formula:

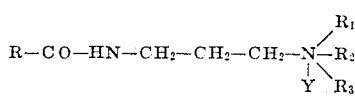

wherein R is a member of the group consisting of aliphatic and alicyclic radicals containing seven to 20 carbon atoms, $R_1$ and $R_2$ are members of the group consisting of alkyl and hydroxyalkyl radicals of one to three carbon atoms, $R_3$ is a hydroxyalkyl radical of one to three carbon atoms, and Y is a nitrate or phosphate anion.